United States Patent Office 3,165,377
Patented Jan. 12, 1965

3,165,377
SEPARATION OF STAINLESS STEEL FROM A NUCLEAR FUEL
Herbert M. Katz, Port Jefferson, N.Y., assignor to the United States of America as represented by the United States Atomic Energy Commission
No Drawing. Filed Apr. 11, 1962, Ser. No. 187,180
3 Claims. (Cl. 23—14.5)

This application relates to a process of separating stainless steel from a nuclear fuel. More particularly, it relates to a process for the separation of a stainless steel cladding from the core of a nuclear fuel element.

Nuclear fuel elements clad with stainless steel are used in commercial power reactors. The advantages in using stainless steel as a cladding are that it permits the use of higher reactor operating temperatures and provides better heat transfer mediums than are possible with other types of claddings. The stainless steel cladding is also more easily fabricated than other claddings and possesses a low neutron cross section. For these reasons stainless steel clad fuel elements will probably represent a major fraction of the annual load used in commercial power reactors.

In the normal course of events after a fuel element has been used in a reactor for a predetermined length of time it is replaced. The spent fuel element is then processed to recover the radioactive fuel and separate out, for storage or use, the various fission products formed during the time it was in the reactor undergoing fission. In this reprocessing procedure the cladding has to be separated from the fuel element core.

Among the proposed processes used in the separation of stainless steel from the core of a fuel element is a process known as the "Sulfex Process." This process involves the use of sulfuric acid to dissolve the stainless steel cladding. It has an advantage in that it results in a greatly reduced volume of radioactive waste which must be permanently stored. However, the "Sulfex Process" has one great disadvantage, it has a high corrosive action on containers. This has been a limiting factor for the extensive use of this process. The container vessels presently in operation when tested for use in the proposed Sulfex process have been found to corrode and crack within a short period of time thus making the process uneconomical.

Therefore, it is an object of this invention to provide a process for the separation of stainless steel from a nuclear fuel element.

A further object of this invention is a process for the separation of stainless steel cladding from a nuclear fuel element.

A more specific object of this invention is a process for the separation of stainless steel cladding from a nuclear reactor in a container which will not corrode nor crack.

It has been found that an improvement of the Sulfex Process results if it is carried out in a stainless steel container which is equipped with a downdraft condenser sparged with oxygen and the solution, in addition to sulfuric acid, contains nitric and sulfamic acids. The separation of stainless steel from the nuclear core is accomplished without any cracking or corrosion of the container walls.

In accordance with this invention the walls of a stainless steel container are retained in a passive state in the presence of sulfuric acid by the continuous addition of nitric acid. It is known in the art that nitric acid will passivate stainless steel. By passive is meant, the inactivity of stainless steel in a sulfuric acid solution. However, this passive state can be disturbed and the stainless steel rendered impassive by contacting the stainless steel with a mild steel as illustrated in ORNL-2785.

If a stainless steel clad nuclear fuel element is placed in a sulfuric acid solution containing nitric acid, the cladding is passive and will not dissolve. When the cladding is contacted with mild steel cladding becomes impassive and will dissolve. However, during the dissolution of stainless steel with a solution of sulfuric and nitric acids, the concentration of nitric acid becomes depleted and the walls of the container corrode and crack. The depletion of the nitric acid concentration in the container is due to the liberation of hydrogen in the course of the dissolution of the stainless steel cladding.

During the dissolution of the stainless steel cladding nitric oxide is also evolved. Therefore, the container in this invention is equipped with a downdraft condenser and oxygen is introduced, by sparging the cold leg thereof, to oxidize nitric oxide to nitrogen dioxide. The thus formed nitrogen dioxide is absorbed in the condensed fluids in the cold leg of the condenser and is thereafter conveyed back to the container in the form of nitric acid. Thus, the nitric acid concentration is maintained.

The presence of a slight concentration of sulfamic acid is added to the solution to prevent the dissolution of the nuclear fuel element by nitric acid.

After the cladding is completely dissolved the core of the nuclear fuel element can be dissolved in the same stainless steel container by removing the decladding solution and adding nitric acid to the stainless steel vessel. The dissolved core can then be processed by known reprocessing techniques such as the Purex process.

For purposes of the invention the composition of the stainless steel used in the construction of the vessel can be of a different composition than is used to clad the nuclear fuel element. It is also with the scope of this invention that the stainless steel container have a composition similar to the nuclear cladding. Stainless steel— 348 or 347 is generally used for the cladding of a nuclear fuel element and can be used also to construct the vessel, although stainless steel 309 is generally used in the construction of such vessels. The precise composition of these steels can be obtained from a manual furnished by The Carpenter Steel Company, Reading, Pennsylvania, entitled, "Working Data—Carpenter Stainless and Heat Resisting Steels." These steels are for illustrative purposes only and this invention is not to be limited in any manner.

For purposes of this invention the mild steel which is used to contact the stainless steel cladding to initiate impassivation and dissolution shall be a steel which has a carbon content of up to 0.2%. The use of a mild steel to impassivate the cladding is used as a preferred means of carrying out this invention. However, the brazes used to hold groups of fuel elements together, can have the same effect of impassivating stainless steel in a sulfuric-nitric acid solution. These brazes are also to be considered within the scope of this invention. Such a composition is a nickel-phosphorous composition presently used to braze fuel elements together. The mild steel, as illustrated hereinafter, is wrapped around the fuel element before inserting it into the sulfuric-nitric acid solution, but any means of contact between the mild steel, any other initiator, and cladding which induces impassivation of the stainless steel is within the contemplation of this invention.

For purposes of this invention the dissolution solution to be placed in the stainless steel container is a sulfuric-nitric acid solution which also contains a small concentration of sulfamic acid. The molarity of the sulfuric acid which is most effective is between about 5.0 and 7.0 M. The molarity of the nitric acid concentration of the solution is between 0.03 M and 0.07 M.

The solution should also contain sulfamic acid in the molarity of from 0.02 to 0.10 M to substantially decrease the dissolution of the nuclear core due to the presence of nitric acid in the solution.

For purposes of this invention the nuclear core of a fuel element clad with stainless steel can be uranium dioxide or metallic uranium. The shape of the element may be rod shaped, a plug, elongated or in the form of pellets.

For a more complete understanding of the invention, reference may be made to the following description. The stainless steel–309 vessel equipped with a downdraft condenser containing a stainless steel–348 cladded fuel element, which is wrapped in mild steel wire, is partially filled with nitric acid. The concentration of the nitric acid is .11 M nitric acid. The solution is heated to approximately 100° C. A 70% solution of sulfuric acid, which prevents spattering in the vessel by reducing the exothermic reaction which will take place, is then added to the solution in sufficient quantity so the final molarity of nitric acid is brought to between 0.03 M and 0.07 M and the molarity of the sulfuric acid is between 5.0 M and 7.0 M. A slight amount of sulfamic acid is also present in the solution prior to the addition of sulfuric acid. The sulfamic acid should be present in an amount sufficient to bring its final molarity to between 0.03 M and 0.10 M. The container, after the sulfuric acid has been added to the nitric acid-sulfamic acid solution, is then heated to approximately 116° C. The stainless steel–348 will go into solution. The solution, containing dissolved stainless steel, can be removed from the container and processed for storage by known methods. The remaining undissolved uranium core is left in the container. Nitric acid can then be added to the container to reprocess the spent uranium fuel element in accordance with known processes, for example, the "Purex Process."

Having best described the process of this invention, it may be further illustrated by the following examples:

EXAMPLE I

Coupons of stainless steel–309, weighing approximately 32 grams, and stainless steel–348, weighing about 28 grams, were placed in a dilute solution of nitric acid. The stainless steel–348 was wrapped with a mild steel wire weighing about 0.7 g. The container used in these experiments was a downdraft glass container painted silver on its interior and equipped to sparge the evolved gases with oxygen in the cold leg of the downdraft condenser. The nitric acid was heated to a temperature of between 85–90° C. Concentrated sulfuric acid was then added. All the acids were added in an amount so the total volume of the solution would have a concentration as set forth in Table I. The solution was then heated to its boiling point in the range of 116 C. The downdraft condenser is then sparged with oxygen at a rate of approximately 21 mil. per minute. Table I indicates the results observed in a series of experiments conducted as set forth above.

*Table I*

| Exp. No. | Concentration in Molarity | | Time in Solution, Hrs. | Results | |
|---|---|---|---|---|---|
| | $H_2SO_4$ | $HNO_3$ | | S.S. 309 | S.S. 348 |
| 1 | 6.0 | 0.03 | 2 | No corrosion | Completely dissolved. |
| 2 | 6.0 | 0.03 | 2 | ___do___ | Do. |
| 3 | 6.0 | 0.02 | 1 | Corrosion | Do. |
| 4 | 6.0 | 0.1 | 1 | ___do___ | Do. |
| 5 | 6.0 | 0.05 | 2 | No corrosion | Do. |

This experiment illustrates that if the concentration of nitric acid is continuously maintained in the range of from 0.03 to 0.05 M by the downdraft condenser sparged with oxygen, the stainless steel not impassivated by a mild steel wire will remain in its passive condition and not corrode. The non-passive stainless steel will, however, dissolve completely.

EXAMPLE II

The same procedure set forth in Example I was followed in this example. However, the concentration of the sulfuric-nitric acid solutions were varied as set forth in Table II.

*Table II*

| Exp. No. | Concentration in Molarity | | Time in Solution, Hrs. | Results | |
|---|---|---|---|---|---|
| | $H_2SO_4$ | $HNO_3$ | | S.S. 309 | S.S. 348 |
| 1 | 4.0 | 0.03 | 2½ | Corrosion | Incomplete dissolution. |
| 2 | 4.0 | 0.05 | 3 | No corrosion | Completely dissolved. |
| 3 | 4.0 | 0.04 | 5½ | ___do___ | Do. |
| 4 | 5.0 | 0.04 | 2 | ___do___ | Do. |
| 5 | 5.0 | 0.03 | 2½ | ___do___ | Do. |

This example, together with Example I, indicates that this invention can be carried out successfully if the nitric acid concentration is maintained in the range of from 0.03 to 0.05 M and the sulfuric acid concentration is in the range of from 4.0 to 6.0 M. This example further illustrates the fact that stainless steel–309 does not corrode in the solution disclosed herein when the downdraft condenser is supplying said solution with a continuous supply of nitrogen dioxide. The nitrogen dioxide, as hereinbefore set forth, being converted to nitric acid to maintain the desired concentration of nitric acid.

EXAMPLE III

This example illustrates the dissolution of stainless steel coupons as identified above in the presence of uranium dioxide fuel slugs. The same procedure as set forth in Example I was followed, except sulfamic acid was added to the nitric acid solution in an amount to equal the final concentrations set forth in Table III. The other acids in the solution were varied as set forth in Table III and uranium dioxide pellets weighing approximately 7 grams were inserted in the condenser together with the stainless steel coupons.

TABLE III

| Exp. No. | Concentration in Molarity | | | Time in Solution, Hr. | Results | | |
|---|---|---|---|---|---|---|---|
| | $H_2SO_4$ | $HNO_3$ | $NH_2SO_3H$ | | SS 309 | SS 348 | Percent Loss, $UO_2$/Hr. |
| 1 | 6.0 | 0.07 | | 1 | Corros | Compl. disol | 1.49 |
| 2 | 6.0 | 0.07 | 0.03 | 1 | ---do--- | ---do--- | 0.10 |
| 3 | 6.0 | 0.05 | | 1 | No corros | ---do--- | .595 |
| 4 | 6.0 | 0.05 | 0.03 | 1 | ---do--- | ---do--- | 0.057 |
| 5 | 6.0 | .04 | | 1 | ---do--- | ---do--- | .390 |
| 6 | 5.0 | .05 | 0.02 | 1 | ---do--- | ---do--- | 0.105 |
| 7 | 5.0 | .05 | 0.03 | 1 | ---do--- | ---do--- | 0.0488 |
| 8 | 5.0 | .07 | 0.03 | 1 | ---do--- | ---do--- | 0.565 |
| 9 | 5.0 | .07 | 0.03 | 1 | ---do--- | ---do--- | 0.203 |
| 10 | 5.0 | .07 | 0.04 | 1 | ---do--- | ---do--- | 0.067 |
| 11 | 5.0 | 0.10 | 0.05 | 1 | ---do--- | ---do--- | 0.456 |
| 12 | 5.0 | 0.10 | 0.07 | 1 | ---do--- | ---do--- | 0.105 |
| 13 | 5.0 | 0.10 | 0.10 | 1 | ---do--- | ---do--- | 0.086 |
| 14 | 7.0 | 0.05 | 0.03 | 2 | ---do--- | ---do--- | 0.181 |

The above table clearly indicates that the sulfamic acid in the solution reduces the percentage loss of uranium oxide to the solution by at least ten fold.

EXAMPLE IV

This example illustrates the use of similar stainless steel metals as a container vessel and as the cladding for the nuclear fuel element. The procedure set forth in Example I was followed except identical coupons of stainless steel-348 were used as seen from:

Table IV

| Concentration in Molarity | | Time in Solution, Hrs. | Results | |
|---|---|---|---|---|
| $H_2SO_4$ | $HNO_3$ | | SS 348 | SS 348w. |
| 6.0 | 0.03 | 2 | No corros | Compl. disol. | w.=wrapped in 0.7 mild steel wire.

Since many embodiments might be made in the present invention and since many changes might be made in the embodiment described, it is to be understood that the foregoing description is to be interpreted as illustrative only and not in a limiting sense.

I claim:

1. A method of separating stainless steel from a mixture of stainless steel and uranium-containing solids comprising: inserting said stainless steel-uranium mixture into a vessel containing nitric acid and equipped with a downdraft condenser, heating said solution to its boiling point, adding sulfuric acid and sulfamic to said condenser until molarities in the range of from 0.03 M to 0.07 M, 5.0 M to 7.0 M, and 0.02 M to 0.10 M, respectively, are achieved; contacting said stainless steel with a metal selected from the group consisting of mild steel and nickel-phosphorus braze compositions to impassivate it in said solution; heating the solution containing said stainless steel to its boiling point to dissolve said stainless steel and generate nitrogen oxide, sparging the cold leg of said downdraft condenser with oxygen to oxidize said nitrogen oxide to nitrogen dioxide which reacts with the condensate being formed in said cold leg to form nitric acid, and returning to said nitric acid to said vessel in order to maintain the molarity of said nitric acid at 0.03 M to 0.07 M.

2. A method of separating stainless steel cladding from a stainless steel clad uranium bearing nuclear fuel element, wherein the method is carried out in a stainless steel clad reaction vessel without harming the vessel, comprising the steps of: contacting the steel clad element with a metal selected from the group consisting of mild steel and a nickel-phosphorus braze composition; placing said steel clad element into a stainless steel downdraft condenser vessel containing nitric acid, heating said nitric acid to approximately 100° C., adding sulfuric acid and sulfamic acid to said solution in an amount to result in a final solution, which covers said mixture with a solution having sulfuric acid in a molarity of from 5.0 M to 7.0 M, nitric acid in a molarity of from 0.03 M to 0.07 M and sulfamic acid in a molarity of from 0.02 M to 0.10 M, heating said final solution to a temperature in the range of approximately 116° C., introducing oxygen in the cold leg of said downdraft condenser to form nitrogen dioxide which combines with the condensate contained therein to form nitric acid; and returning said nitric acid to the downdraft condenser vessel in order to maintain the molarity of said nitric acid at 0.03 M to 0.07 M.

3. The method of claim 2 in which the metal contacting the stainless steel clad element is a mild steel.

References Cited by the Examiner

AEC Document ORNL–2785, Nov. 20, 1959, pp. 4, 6, and 8.
AEC Document ORNL–2714, Nov. 2, 1959, p. 7.
AEC Document HW 66191, Aug. 8, 1960, p. 7.
Bruce et al.: Process Chemistry III (1959), p. 96.

CARL D. QUARFORTH, *Primary Examiner.*

REUBEN EPSTEIN, *Examiner.*